(12) United States Patent
Chang et al.

(10) Patent No.: US 10,356,173 B2
(45) Date of Patent: Jul. 16, 2019

(54) MAINTAINING AND CACHING SERVER CONNECTIONS

(71) Applicant: Microsoft Technology Licensing, LLC, Redmond, WA (US)

(72) Inventors: MingChieh (Jackie) Chang, Taipei (TW); Sheng-Yao (George) Shih, Taipei (TW); Shu-Yu (Steve) Hu, Redmond, WA (US); Ta-Chung (Terry) Tsai, Redmond, WA (US); Hsin Hui (Ellen) Huang, Taipei (TW)

(73) Assignee: Microsoft Technology Licensing, LLC, Redmond, WA (US)

( * ) Notice: Subject to any disclaimer, the term of this patent is extended or adjusted under 35 U.S.C. 154(b) by 153 days.

(21) Appl. No.: 15/080,921

(22) Filed: Mar. 25, 2016

(65) Prior Publication Data
US 2016/0337466 A1 Nov. 17, 2016

(30) Foreign Application Priority Data
May 14, 2015 (CN) .......................... 2015 1 0246382

(51) Int. Cl.
*G06F 15/173* (2006.01)
*H04L 29/08* (2006.01)
*G06F 9/46* (2006.01)

(52) U.S. Cl.
CPC ............ *H04L 67/1097* (2013.01); *G06F 9/46* (2013.01); *H04L 67/145* (2013.01)

(58) Field of Classification Search
CPC .......................... H04L 67/1097; H04L 67/145
USPC ........................................................ 709/226
See application file for complete search history.

(56) References Cited

U.S. PATENT DOCUMENTS

| | | | |
|---|---|---|---|
| 6,965,930 B1 * | 11/2005 | Arrowood | ............... G06F 9/505 709/223 |
| 7,454,564 B2 | 11/2008 | Roskind | |
| 7,702,796 B2 * | 4/2010 | Shen | ....................... H04L 69/40 370/395.21 |
| 7,716,721 B2 | 5/2010 | Zavalkovsky et al. | |
| 7,970,923 B2 | 6/2011 | Pedersen et al. | |
| 7,978,630 B2 | 7/2011 | Bengtsson et al. | |
| 8,065,419 B2 | 11/2011 | Vimpari et al. | |
| 8,335,819 B2 | 12/2012 | Fu | |
| 8,402,289 B2 | 3/2013 | Maciocco et al. | |

(Continued)

FOREIGN PATENT DOCUMENTS

| | | |
|---|---|---|
| EP | 2608032 A1 | 6/2013 |
| WO | 2014066393 A1 | 5/2014 |

OTHER PUBLICATIONS

U. Hohenstein, M. C. Jaeger and M. Bluemel, "Improving Connection Pooling Persistence Systems," 2009 First International Conference on Intensive Applications and Services, Valencia, 2009, pp. 71-77. (Year: 2009).*

(Continued)

*Primary Examiner* — Taylor A Elfervig
(74) *Attorney, Agent, or Firm* — Christopher J. Volkmann; Kelly, Holt & Christenson, PLLC

(57) ABSTRACT

A set of runspaces with active connections are maintained in a pool. A set of timers are set and, based upon the timers, simple commands are submitted through the runspaces, to maintain the connections in an active state. The runspaces with the active connections can then be used from the cache, without having to open a new connection.

19 Claims, 12 Drawing Sheets

(56) References Cited

U.S. PATENT DOCUMENTS

| | | | |
|---|---|---|---|
| 8,484,242 B1* | 7/2013 | Singh | G06F 16/2453 707/770 |
| 8,761,756 B2 | 6/2014 | Backholm et al. | |
| 8,775,737 B2 | 7/2014 | Hsieh et al. | |
| 8,782,222 B2 | 7/2014 | Luna et al. | |
| 8,788,783 B1 | 7/2014 | Karnati et al. | |
| 8,806,250 B2 | 8/2014 | Gatta et al. | |
| 8,843,876 B2 | 9/2014 | Fioritoni et al. | |
| 9,098,565 B1* | 8/2015 | Kumarjiguda | G06F 16/288 |
| 9,930,122 B1* | 3/2018 | Kilday | H04L 67/141 |
| 2004/0046787 A1* | 3/2004 | Henry | G06F 8/38 715/744 |
| 2004/0088413 A1* | 5/2004 | Bhogi | G06F 9/5061 709/226 |
| 2004/0264381 A1 | 12/2004 | Banerjee et al. | |
| 2006/0095572 A1* | 5/2006 | Burke | H04L 67/14 709/227 |
| 2006/0173866 A1* | 8/2006 | Newport | H04L 67/42 |
| 2009/0034537 A1* | 2/2009 | Colrain | H04L 45/121 370/400 |
| 2010/0217872 A1* | 8/2010 | Martchenko | G06F 9/547 709/227 |
| 2011/0276579 A1* | 11/2011 | Colrain | G06F 9/5027 707/756 |
| 2012/0124217 A1* | 5/2012 | Bartley | G06F 1/3209 709/227 |
| 2012/0331087 A1 | 12/2012 | Luna et al. | |
| 2013/0007484 A1 | 1/2013 | Gobriel et al. | |
| 2013/0151719 A1 | 6/2013 | Herzog et al. | |
| 2013/0182572 A1 | 7/2013 | Backholm et al. | |
| 2015/0026291 A1* | 1/2015 | Sandev; Vikas | G06F 15/17306 709/217 |
| 2017/0195334 A1* | 7/2017 | Katieb | H04L 63/10 |

OTHER PUBLICATIONS

F. Liu, "A Method of Design and Optimization of Database Connection Pool," 2012 4th International Conference on Intelligent Human-Machine Systems and Cybernetics, Nanchang, Jiangxi, 2012, pp. 272-274. (Year: 2012).*

"Configuring OracleAS Web Cache for HTTPS Requests", Pulished on: Mar. 18, 2012 Available at: http://docs.oracle.com/cd/B14099_19/caching.1012/b14046/https.htm#BABEIHFE.

"Oracle® Application Server Web Cache Administrator's Guide", Published on: Nov. 20, 2011 Available at: http://docs.oracle.com/cd/B14099_19/caching.1012/b14046/basics.htm.

"International Search Report and Written Opinion Issued in PCT Application No. PCT/US2016/024199", dated Jun. 7, 2016, 14 Pages.

"Windows PowerShell", Retrieved from: <<https://en.wikipedia.org/w/index.php?title=Windows_PowerShell&oldid=661789299>>, May 11, 2015, 17 Pages.

Second Written Opinion for International Patent Application No. PCT/US2016/024199, dated Sep. 8, 2016, date of filing: Mar. 25, 2016, 10 pages.

International Preliminary Report on Patentability for International Patent Application No. PCT/US2016/024199, dated Jul. 11, 2017, date of filing: Mar. 25, 2016, 9 pages.

* cited by examiner

MAINTAINING AND CACHING SERVER CONNECTIONS

CROSS-REFERENCE TO RELATED APPLICATION

The present application is a continuing of and claims priority of International patent application Serial No. CN 201510246382.0, filed May 14, 2015, and published in English the content of which is hereby incorporated by reference in its entirety.

BACKGROUND

Computer systems are currently in wide use. Some computer systems are deployed as remote services that serve end users at end user computing systems. These end user computing systems may be referred to as end points.

In providing services to an end point, a remote computer system (e.g., a remote server environment), may manage connections to the end point. In doing so, the remote server environment may monitor traffic on end points and close (or kill) connections that have not been used in a certain amount of time. This can cause delays to users who are attempting to access the end point, through the connections.

By way of example, end users may use remote data centers or other remotely hosted computing systems. Engineers that maintain those remotely hosted computing systems may also attempt to access the environments at the end points in order to perform maintenance or other engineering operations. The engineering users may also query the end points for a whole host of different types of information that can be used in diagnosing problems, performing debugging operations, etc. In doing so, the engineers sometimes access the end points through a portal that maintains connections to the end points. It can take a relatively long time in order to establish this type of connection, and this can decrease the performance of the various computing systems involved, because they are using computing and memory overhead in order to establish the connections. It can also degrade the efficiency of the users involved, because they are spending time and other resources waiting for the connections to be established.

Some current systems attempt to maintain a cache of opened connections that can be used by the users to access the end points. However, the connections in the cache may have expired on the server side, because a given session has timed out for non-use. In that case, the connection needs to be reopened, before it can be used.

In these types of systems, it can be difficult to even know whether a cached connection is alive. Sometimes, one can only know that the connection has timed out when one attempts to use it. This can result in degraded performance. For instance, the user may submit a request to an instance of a runspace that runs the application process. The runspace may then attempt to submit the request to the application over the connection. That submission may fail because the connection has timed out. The runspace then attempts to reopen the connection and resubmit the user request in order to obtain results. In such a scenario, the user spends additional time because the runspace first submits the request and only then finds out that the connection has timed out. Only after finding that out, the runspace begins the process of reopening the connection. This is slower, in fact, than having the runspace simply open a new connection with each submission. However, even opening a connection can take an undesirable amount of time, and processing resources, and it can lead to unwanted inefficiencies.

The discussion above is merely provided for general background information and is not intended to be used as an aid in determining the scope of the claimed subject matter.

SUMMARY

A set of runspaces with active connections are maintained in a pool. A set of timers are set and, based upon the timers, simple commands are submitted through the runspaces, to maintain the connections in an active state. The runspaces with the active connections can then be used from the cache, without having to open a new connection.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
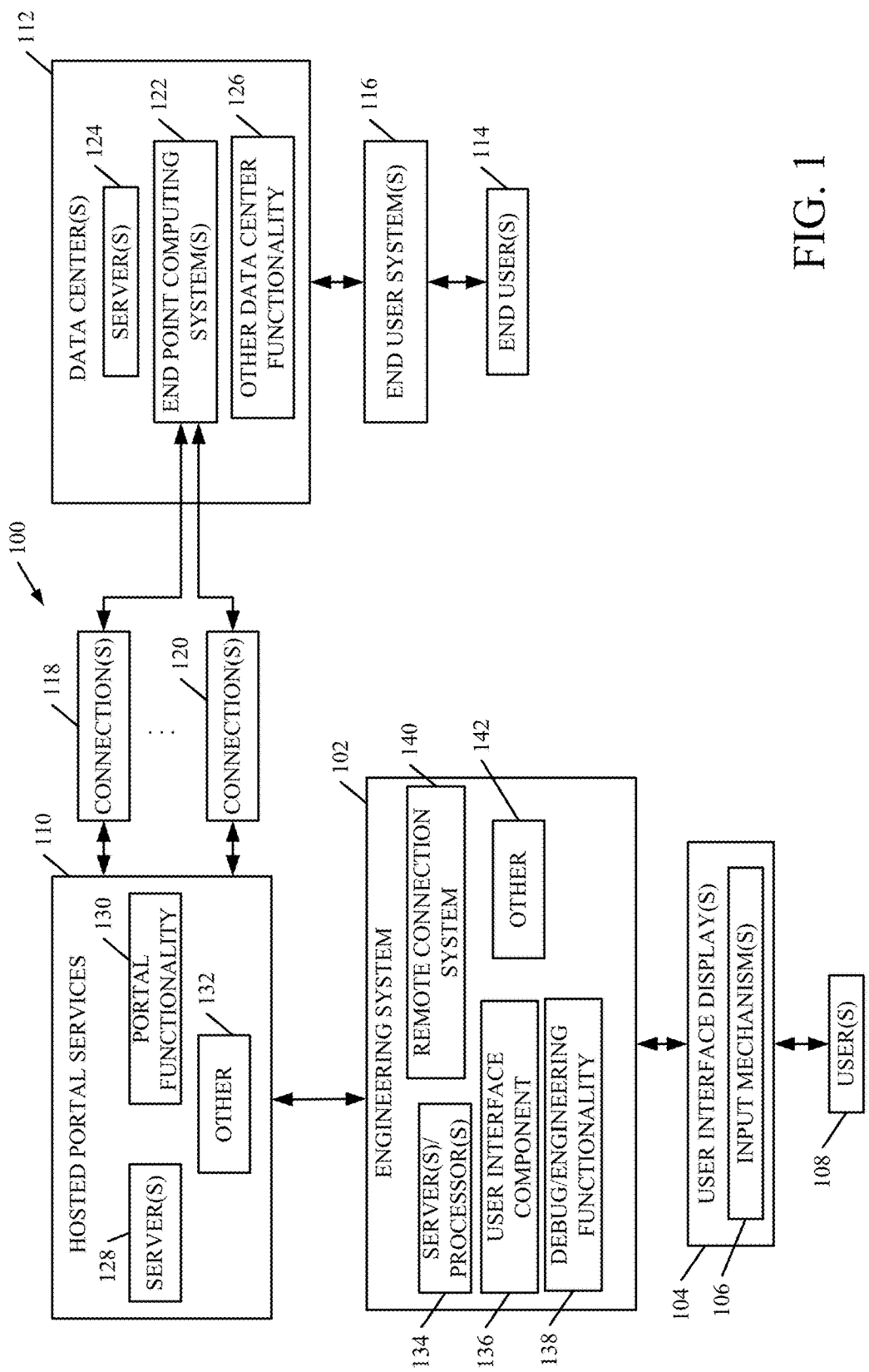
FIG. 1 is a block diagram of one example of a connection maintenance architecture that maintains connections to end points in an active state.

FIG. 1 is a block diagram of one example of a connection maintenance architecture 100. Architecture 100 illustratively includes engineering system 102, hosted portal services 110, and data centers 112. Data centers 112 can be accessed by end users 114 through end user systems 116. Engineering system 102 generates user interface displays 104, with user input mechanisms 106, for interaction by users 108. Users 108 can illustratively be engineers or other maintenance personnel that interact with user input mechanisms 106 in order to control engineering system 102 to access data centers 112 in order to perform engineering operations in data centers 112.

In order to provide users 108 with access to data centers 112, hosted portal services 110 illustratively maintain connections 118-120 with each of a plurality of different end point computing systems 122 in data centers 112. End point computing systems 122 illustratively allow users 108 to perform operations using servers 124, and other data center functionality 126 in data centers 112.

Hosted portal services 110 illustratively include servers 128, portal functionality 130, and it can include other items 132. Portal functionality 130 illustratively provides a portal by which users 108 can access information in data centers 112 through connections 118-120.

Engineering system 102 illustratively includes one or more servers or processors 134, user interface component 136, debug and engineering functionality 138, remote connection system 140, and it can include other items 142. Remote connection system 140 illustratively interacts with hosted portal services 110 in order to maintain the set of connections 118-120 with each of the end point computing systems 122. Remote connection system 140 is described in greater detail below with respect to FIGS. 2-7.

User interface component 136 illustratively generates user interface displays 104 with user input mechanisms 106. It can do this either on its own, or under the control of debug/engineering functionality 138, server/processors 134, or any of the other items in engineering system 102. Debug/engineering functionality 138 illustratively allows users 108 to perform debugging or other engineering operations relative to data centers 112.

Figure 2:
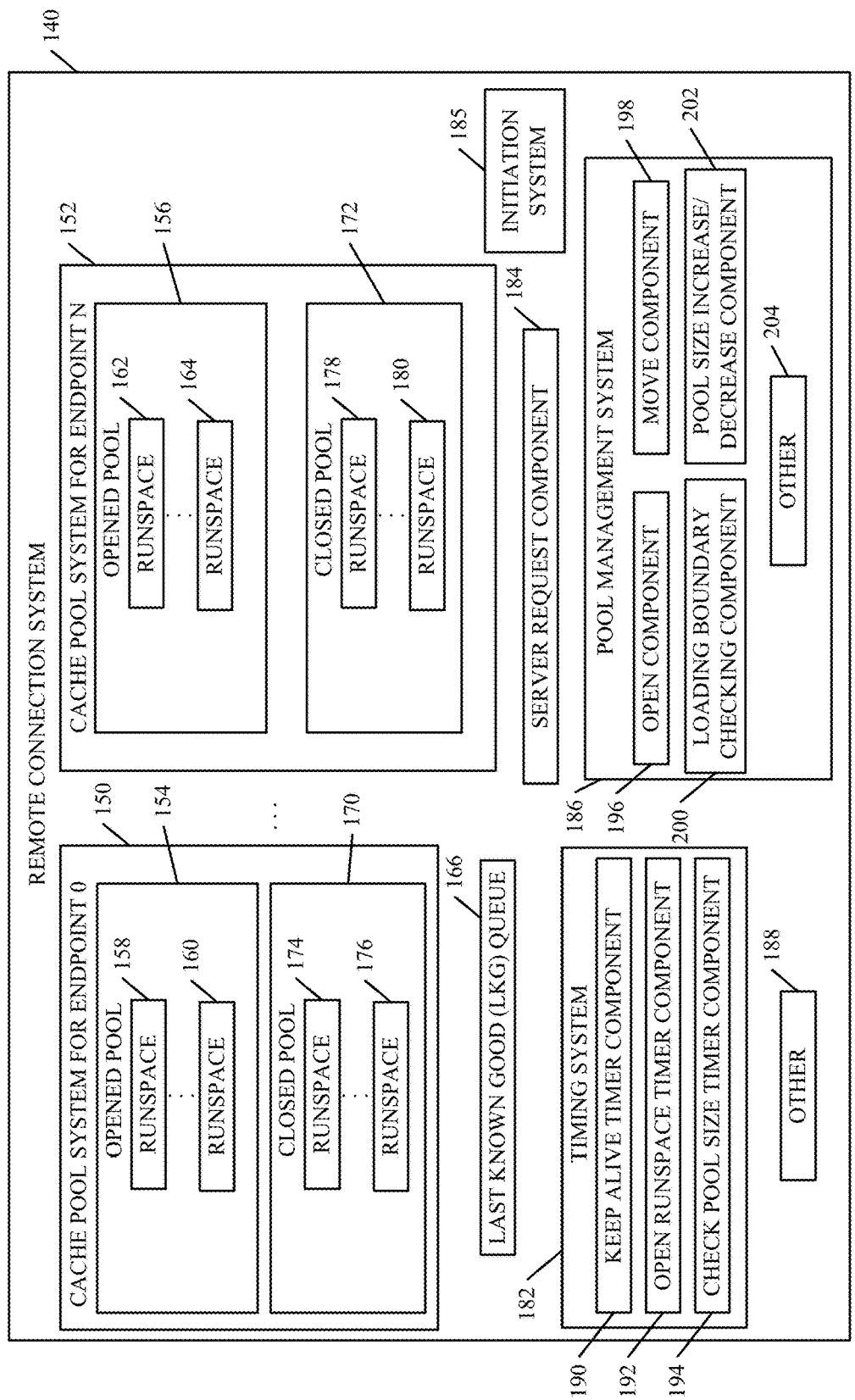
FIG. 2 is a more detailed block diagram of one example of a remote connection system that maintains the connections.

FIG. 2 is a more detailed block diagram of one example of remote connection system 140. FIG. 2 shows that, in one example, remote connection system 140 illustratively includes a cache pool system for each of the different end point computing systems 122. FIG. 2 assumes that there are N end points and therefore each runspace instance 158-164 is illustratively an instantiation of a runtime that runs application processes on the end points to which they are connected. Each runspace instance can have a "closed" status, an "opened" status, and a "using" status. The "closed" status indicates that the action corresponding to that runspace instance is closed or has not been created. The "opened" status indicates that the connection for the runspace instance has been created and is active or open. Thus, the runspace instance can be used directly to submit a command, if its status is "opened". The "using" status indicates that the runspace instance is already being used. Therefore, for instance, if they are in the opened pools 154-156, this means that their corresponding connections 118-120 to the end points is active so that they can be used to process submissions by user 108.

Each of the cache pool systems 150-152, for each of the end points, also illustratively includes a closed pool 170-172. The closed pools 170-172 include runspace instances 174-176 and 178-180, respectively, that have closed or that have connections associated with them that have timed out.

System 140 includes a last known good queue 166. Last known good queue 166 illustratively contains a queue of runspace instances that were the last successfully used runspace instances. Because they were successfully used, this means that their connections were active. Therefore, the highest runspace identifier in queue 166 is the last known runspace instance 158-164 that was successfully used. That is, the first entry in queue 166 is the last known good runspace instance 158-164, and the last entry in queue 166 is a good runspace instance, but it has not been used in the longest time of all runspace instances in the opened pools 154-156.

Remote connection system 140 also illustratively includes timing system 182, server request component 184, initialization system 185, pool management system 186, and it can include other items 188. Timing system 182 illustratively includes a set of timers, such as keep alive timer component 190, open runspace timer component 192 and check pool size timer component 194. It can of course include other items as well. The operation of each of the timer components 190-194 is described in greater detail below. Briefly, however, keep alive timer component 190 includes a timer that, when it is timed out, causes server request component 184 to submit a simple request through a given runspace instance in order to keep its corresponding connection alive. Open runspace timer component 192 includes a timer that, when it expires, causes pool management system 186 to attempt to open a closed runspace instance and from each closed pool 170-172 thus move it from its closed pool to its corresponding open pool. Check pool size timer component 194 illustratively includes a timer that, when it expires, causes pool management system 186 to either increase or decrease the number of runspace instances. Again, these are described in greater detail below.

Server request component 184 illustratively submits user requests through a given runspace instance, and its corresponding connection, to various end points in data centers 112. This is described in greater detail below as well.

Pool management system 186 illustratively includes open component 196, move component 198, loading boundary checking component 200, pool size increase/decrease component 202, and it can include other items 204. Open component 196 illustratively opens various runspace instances and corresponding connections. Move component 198 illustratively moves runspace instances between the opened pools and closed pools, based upon whether their connection is opened or closed. Loading boundary checking component 200 illustratively checks boundary conditions to determine whether additional runspace instances should be added in any of the cache pool systems 150-152. Pool size increase/decrease component 202 illustratively increases the size of any or all of the cache pools in systems 150-152, or decreases them, based upon whether loading boundary conditions are met in order to increase or decrease the pool size.

Figure 3:
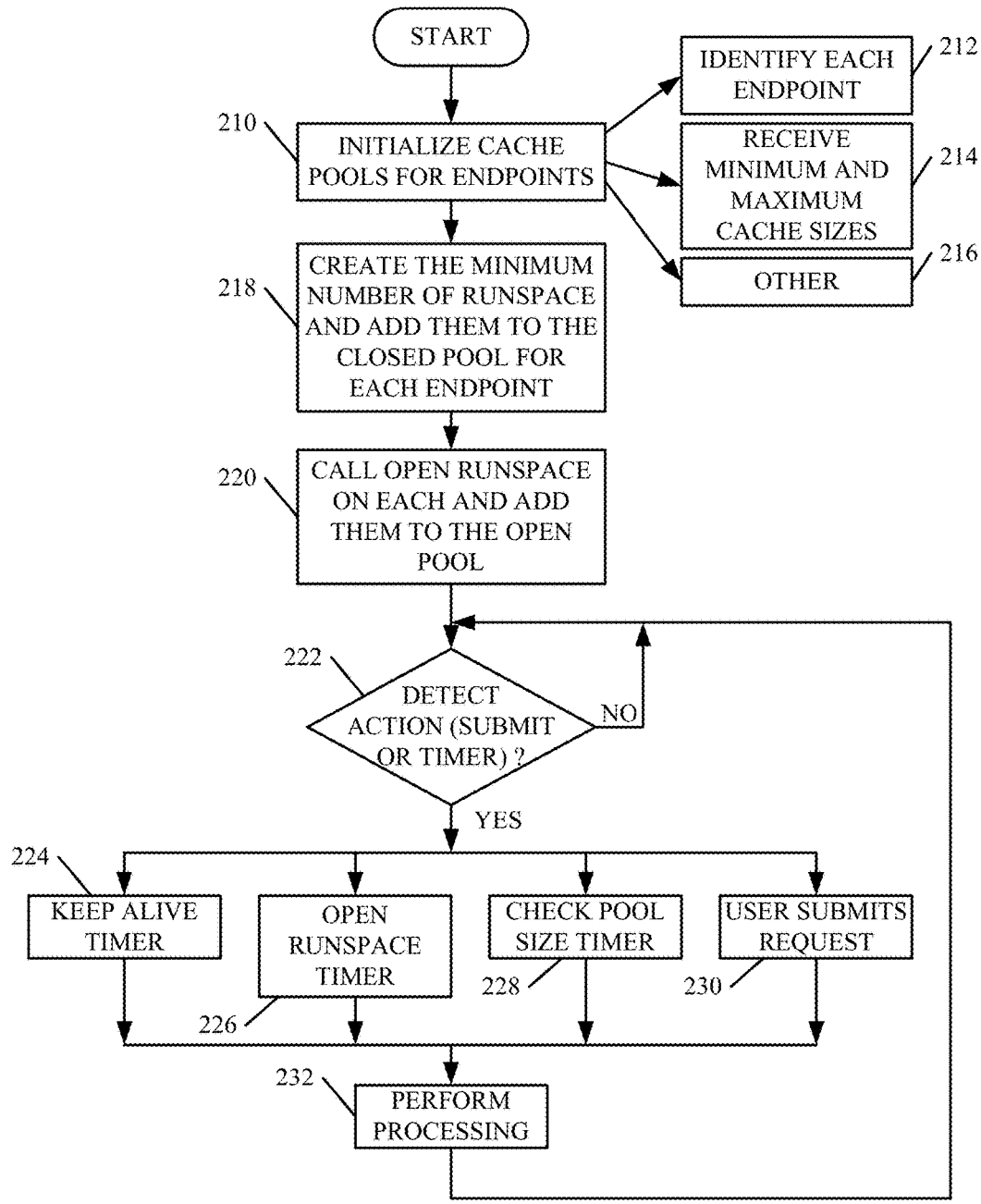
FIG. 3 is a flow diagram illustrating one example of how runspace caches are initialized in the architectures shown in FIGS. 1 and 2.

FIG. 3 is a flow diagram illustrating one example of the operation of how remote connection system 140 operates to initialize the cache pools in cache pool systems 150-152. It is first assumed that there are no runspace instances in any of the cache pools. Therefore, initialization system 185 first initializes the cache pools for each of the end points. This is indicated by block 210. In doing so, it can identify the identity of each of the end points as indicated by block 212. It can also receive a set of minimum and maximum cache sizes 214 and it can receive or generate other items as well, and this is indicated by block 216.

It then creates the minimum number of runspace instances for each cache pool system 150-152, and adds them to the corresponding closed pools 170-172, for each end point. This is indicated by block 218.

Initialization system 185 then calls open component 196 to open each of the runspace instances and move them to the opened pools 154-156. This is indicated by block 220.

Remote connection system 140 then simply waits to receive an action (which can be user 108 submitting a request for processing, or a time out indicator indicating that any of the various timers has timed out, etc.). This is indicated by block 222.

Remote connection system 140 then performs the processing based upon the type of action that has been detected. For instance, it can perform keep alive processing if the keep alive timer has expired. This is indicated by block 224. It can perform runspace opening operations if the open runspace timer has expired. This is indicated by block 226. It can perform pool size operations if the check pool size timer has expired. This is indicated by block 228. It can also perform a user submission request if the user has submitted a request for processing. This is indicated by block 230. It performs the desired processing as indicated by block 232, and then returns to block 222 where it waits to detect another action.

Figure 4:
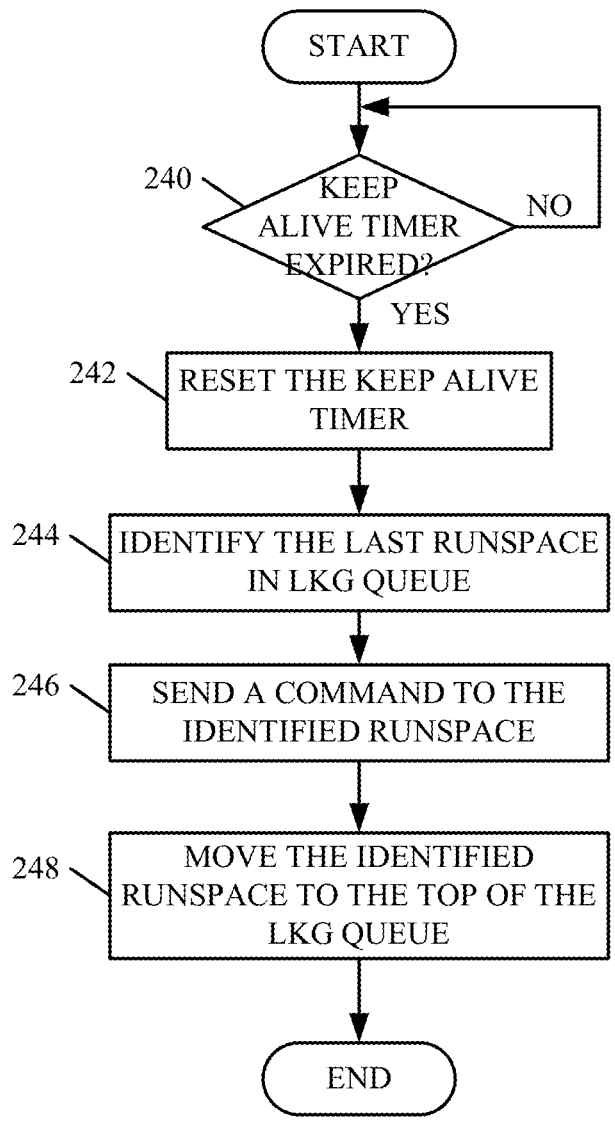
FIG. 4 is a flow diagram illustrating one example of the operation of the remote connection system in responding to a keep alive timer.

FIG. 4 is a flow diagram illustrating one example of the operation of keep alive timer component 190. Keep alive timer component 190 performs processing so that each of the runspace instances in the opened pools 154-156 is used before it times out. This will keep each of those instances in the "opened" status.

Keep alive timer component 190 first determines that the keep alive timer has expired. This is indicated by block 240 in FIG. 4. It then immediately resets the keep alive timer as indicated by block 242.

Keep alive timer component 190 then identifies the last runspace instance in each LKG queue 166. This is indicated by block 244. Recall that this is the runspace instance that is good (meaning that it has an open connection), but it is the instance that has not been used in the longest amount of time relative to other runspace instances in the corresponding opened pools 154-156.

Keep alive timer component 190 then controls server request component 184 to submit a command to the identified runspace instance. This is indicated by block 246. In one example, it sends a relatively simple command to the instance that is then submitted through hosted portal services 110, and to data centers 112. This will indicate to services 110 and data centers 112 that the corresponding connection 118-120 is still being used and therefore it is kept alive. Move component 198 then moves the identified runspace instance (the one that has just had the command submitted through it) to the top of the LKG queue 166, because they are the most recently used runspace instance. This is indicated by block 248.

It will be noted that the keep alive timer can be set in a wide variety of different ways. In one example, it is set to wake up (or expire) depending upon the number of opened runspace instances in the opened pools 154-156. It will also be noted that there can be a separate keep alive timer for each cache pool system (e.g., for each end point). However, in another example, one keep alive timer is used for all cache pool systems. Therefore, in one example, for instance, the keep alive timer wakes up every five minutes divided by the total number of opened runspace instances in the opened pools. For instance, assume that opened pools have ten runspace instances in them. This means that the keep alive timer will wake up every five minutes divided by ten runspace instances (or every 30 seconds). It will then submit a request. The predetermined amount of time (e.g., the five minutes) may be set because that is the time out period at which point either hosted portal services 110 or data centers 112 will kill the connection corresponding to that runspace instance. This means that each of the runspace instances that have an active connection will have those connections maintained as active because a command will be sent within the time out period corresponding to each of those connections, and they will not be killed by any of the back end systems. Of course, the keep alive timer can be set in other ways as well.

Figure 5:
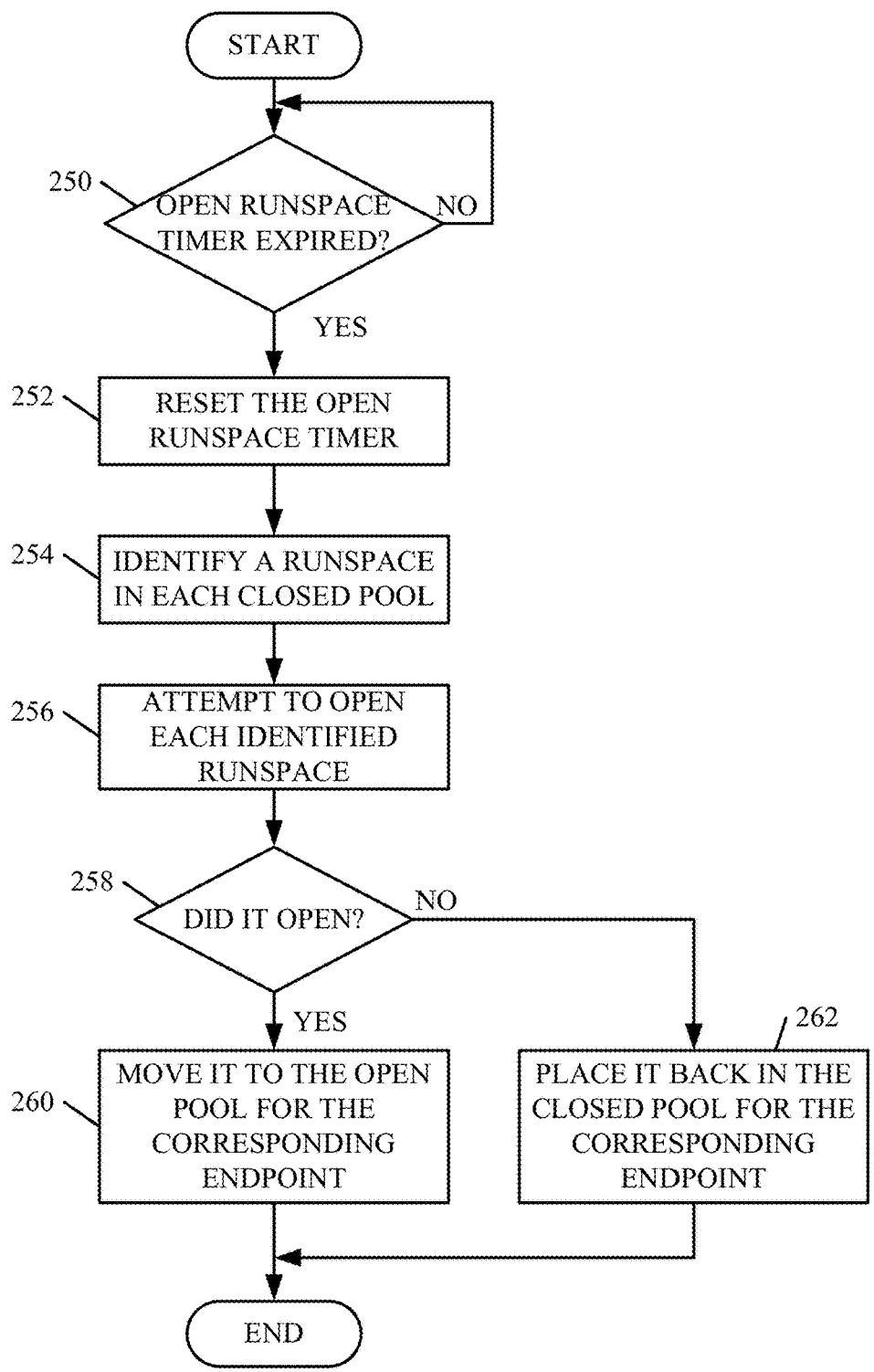
FIG. 5 is a flow diagram illustrating one example of the operation of the remote connection system shown in FIG. 2 in responding to an open runspace timer.

FIG. 5 is a flow diagram illustrating one example of the operation of open runspace timer component 192. It will be appreciated that, even though a runspace instance has been opened, it may still go back to the closed status and therefore move to closed pool 170 for a variety of different reasons. For instance, it may be that the end point has died. Thus, in order to reopen the runspace instances in the closed pools 170-172, open runspace timer component 192 can be used. Open runspace timer component 192 will illustratively have an open runspace timer. In one example, there may be one such timer corresponding to each end point (and therefore corresponding to each cache pool system 150-152). In another example, one timer serves all cache pool systems 150-152. Open runspace timer component 192 will illustratively determine that the open runspace timer has expired. This is indicated by block 250. It will then immediately reset the open runspace timer as indicated by block 252.

Component 192 then identifies a runspace in each closed pool 170-172. This is indicated by block 254. It then controls open component 196 and attempts to open the identified runspace instances. This is indicated by block 256. If it is successful, as determined at block 258, then component 192 controls move component 198 to move the identified runspace instances (which have just been opened) to its corresponding opened pool 154-156. This is indicated by block 260. A corresponding entry will also be made in the LKG queue 166-168.

If open component 196 was unable to open any of the identified runspace instances, then those instances are placed back in its corresponding closed pools 170-172. This is indicated by block 262.

Figure 6:
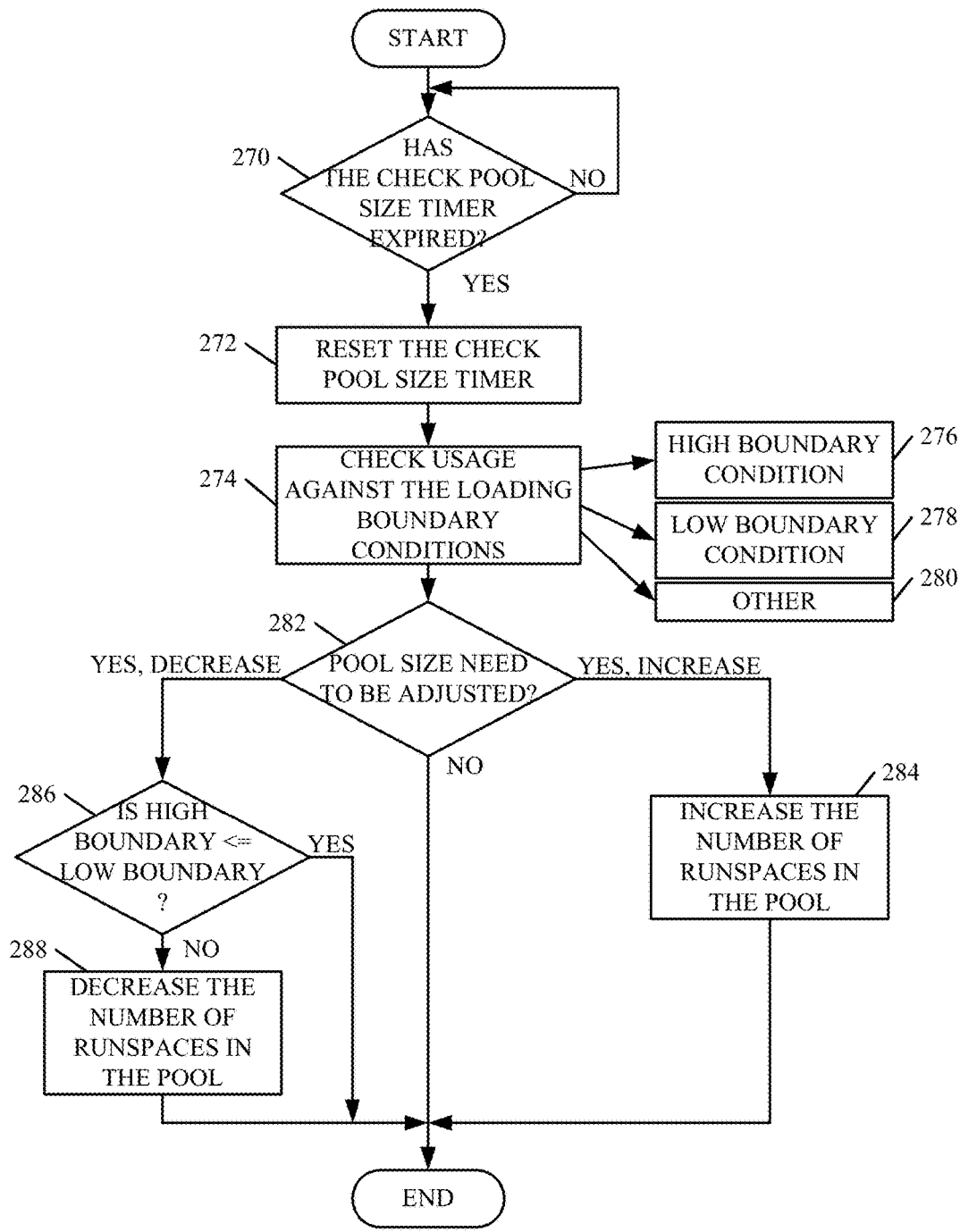
FIG. 6 is a flow diagram illustrating one example of the operation of the remote connection system shown in FIG. 2 in increasing and decreasing runspace cache sizes.

FIG. 6 is a flow diagram illustrating one example of the operation of check pool size timer 194. Component 194 is provided in recognition of the fact that when a user submits a request, but no runtime instance is available or has an open connection, the user will need to spend time to wait for the connection to be opened. However, it also recognizes that if too many runtime instances are open at any given time, this may occupy unnecessary server resources. Therefore, check pool size timer component 194 can operate to accommodate a compromise. It illustratively predicts the number of runspace instances that will be needed and attempts to increase or decrease the cache size automatically. This can be done by using a set of boundary conditions where, if the runtime instance usage is above the boundary conditions, the cache size can be increased by opening additional runtime instance. If the runtime instance usage is below the boundary conditions, then the cache size can be decreased by closing runtime instances. This determination can be made periodically or otherwise intermittently based upon expiration of a check pool size timer. There may be a separate pool size timer corresponding to each cache pool system 150-152 (and thus corresponding to each end point) or a single timer can serve all systems 150-152. These are only examples.

Component 194 first determines that the check pool size timer has expired. This is indicated by block 270 in FIG. 6. It then immediately resets the check pool size timer as indicated by block 272.

Component 194 then controls loading boundary checking component 200 to check the runtime instance usage against the various boundary conditions. This is indicated by block 274. For instance, the boundary conditions may include a high boundary condition 276, a low boundary condition 278, and it can include a variety of other boundary conditions 280. If the runtime instance usage is above the high boundary condition 276, then the cache pool size may need to be adjusted by increasing run time instances. If it is below the low boundary condition 278, then the pool size may need to be adjusted by decreasing runspace instances. However, if the runspace instance usage is between the two boundary conditions, then action may not need to be taken.

Determining whether the pool size needs to be adjusted based upon the check of runspace instance usage against the boundary conditions is indicated by block 282. If, indeed, the pool size needs to be increased, then component 194 calls pool size increase/decrease component 202 to increase the number of runspace instances in the pool or pools. This is indicated by block 284.

If, however, the runspace instance usage is below the low boundary condition 278, then a number of things can happen. For instance, in one example, the high and low boundary conditions change dynamically. For instance, the high boundary condition may be the total number of runspace instances that are opened for a given end point (including those that have an "opened" status, those that have a "using" status and those that have a "closed" status) minus two times the number of runspace instances that are in the opened pool 154. Similarly, the low loading boundary condition may simply be two times the number of runspace instances that are in the opened pools 154-156. Thus, it can be seen that the boundary conditions vary dynamically. If that is the case, then if the current runspace instance usage is below the low boundary condition, component 200 also checks to determine whether the high boundary condition is less than or equal to the low boundary condition. If that is the case, as indicated by block 286, then no action is taken. However, if, at block 286, it is determined that the high boundary condition is greater than the low boundary condition, then component 200 controls pool size increase/decrease component 202 to decrease the number of runspace instances in the pools so there are similar numbers of runspaces (the sum of the runspaces with opened, closed and using status) in each pool system. This is indicated by block 288.

The number of runspaces instances by which a given pool is increased or decreased at any given time can vary. In one example, however, the runspace instances in a set of pools are increased by one if the runspace instance usage over the previous two minutes is consistently higher than the high loading boundary condition. The number of runspaces instances can be decreased by one in a set of pools if the runspace instance usage has been below the low boundary condition for the past two minutes. Of course, these times and the number of instances by which the pool size is increased or decreased are examples only, and they can vary widely.

Figure 7:
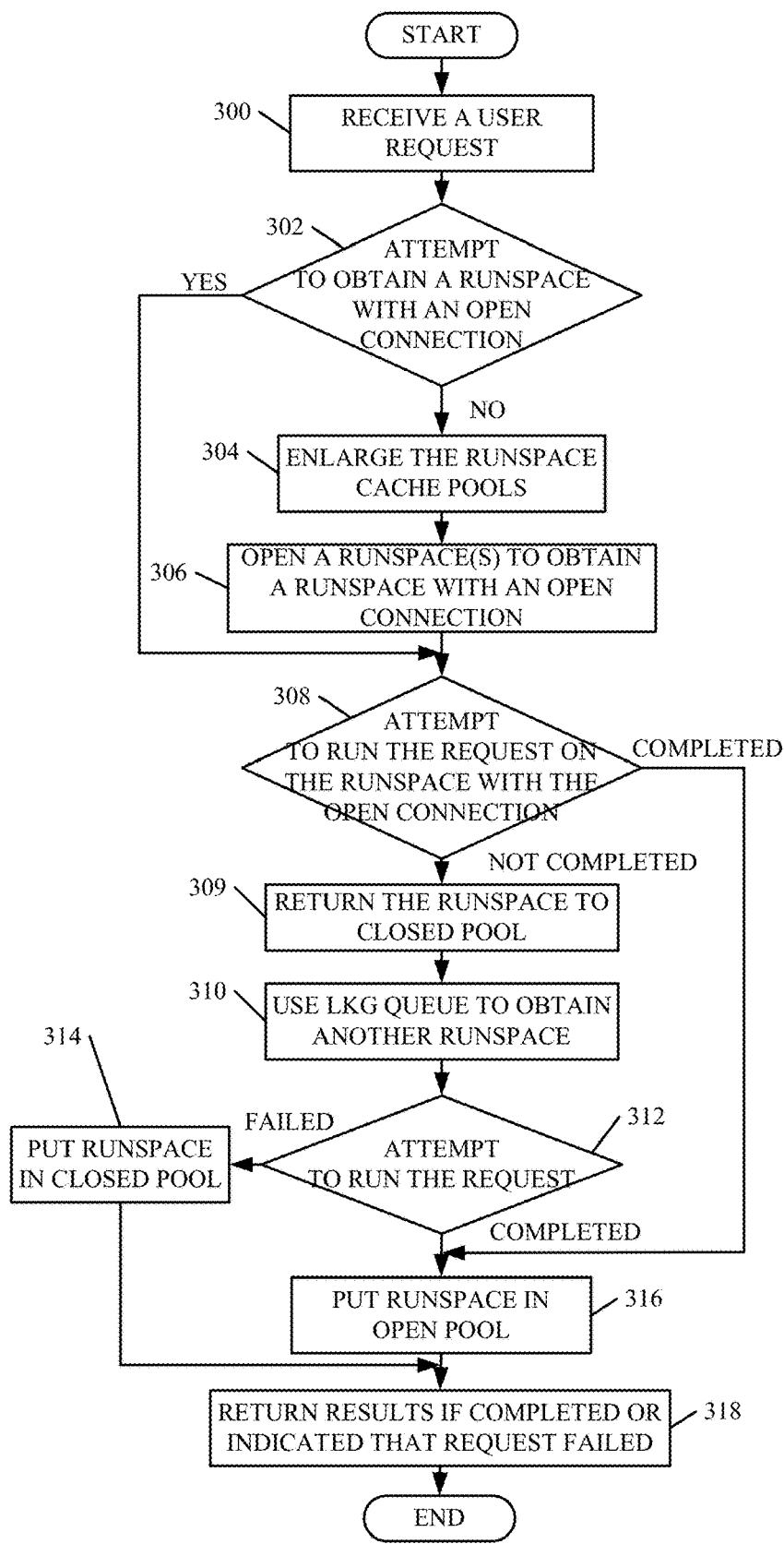
FIG. 7 is a flow diagram illustrating one example of the operation of the architecture shown in FIG. 1 in servicing a user request submitted through a runspace instance.

FIG. 7 is a flow diagram illustrating one example of the operation of remote connection system 140 in processing a user request. For instance, assume that the cache pool systems 150-152 have been initialized for each end point (end points 0-N). Now assume that a user 108 has submitted a request that is to be processed through a given runspace instance, by one of the end points. Server request component 184 first receives the user request as indicated by block 300.

It then attempts to obtain a runspace instance with an open connection from one of the opened pools 154-156 corresponding to one of the end points. This is indicated by block 302. If it is unsuccessful, then it calls pool size increase/decrease component 202 to enlarge the runspace cache pools 154-156, because no runspace instances were readily available to service the request submitted by the user. This is indicated by block 304. It then controls open component 196 to open one of the new runspace instances to obtain a runspace instance with an open connection, as indicated by block 306.

Then, or if the attempt to obtain a runspace instance with an open connection at block 302 was successful, server request component 184 attempts to run the request of the runspace instance with the open connection that has been obtained. This is indicated by block 308. If the attempt is successful, processing continues at block 316 as described below. If that attempt is unsuccessful, then the runspace instance is returned to its closed pool, as indicated by block 309, and server request component 184 uses the LKG queue 166 to obtain the most recently used runspace instance. This is indicated by block 310. This is done because, since the user's request has already failed once, this increases the likelihood that a good runspace instance will be obtained and that the user's request will be successfully run.

Server request component 184 then again attempts to run the request on the newly obtained runspace instance that was obtained through the LKG queue. This is indicated by block 312. If that request fails, then the runspace instance that was being used is placed in the closed pool 170-172 for the corresponding end point. This is indicated by block 314. However, if the attempt to run the request was successful, then the runspace instance is placed back in the opened pool 154-156 and a corresponding entry is made in the LKG queue 166. This is indicated by block 316.

If the attempt to run the request was successful, then the results are returned to the user. If, on the other hand, the request failed, then a message is sent to the user indicating that the request has failed. This is indicated by block 318 in FIG. 7.

It can thus be seen that the present system advantageously maintains connections corresponding to runspace instances opened by intermittently sending relatively simple commands through those connections. This ensures that the back end systems will not kill those connections for lack of use. It also manages the cache size of opened runspace instances and maintains open runspace instances even before they need to be used. This significantly reduces the processing overhead for the various computing systems. That overhead need not be consumed in attempting to submit requests through runspace instances that have closed connections, only then realizing that the connections have been closed and attempting to reopen them. It also significantly improves the user efficiency, because it increases the likelihood that a runspace instance will be available and have an open connection, without the user needing to wait for either the runspace instance to be created or for the corresponding connection to be opened. It can also use the LKG queues to increase the likelihood that a user request will be serviced by a known, good runspace instance. Similarly, the pool management system maintains the cache or pool sizes so that an overabundance of resources are not consumed in maintaining opened runspace instances that are not being used, but that sufficient runspace instances are maintained with opened connections so that the user need not wait for one to be created and for the connection to be opened. All of these items advantageously improve the operation of the computing systems themselves and the efficiency of the users.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 8:
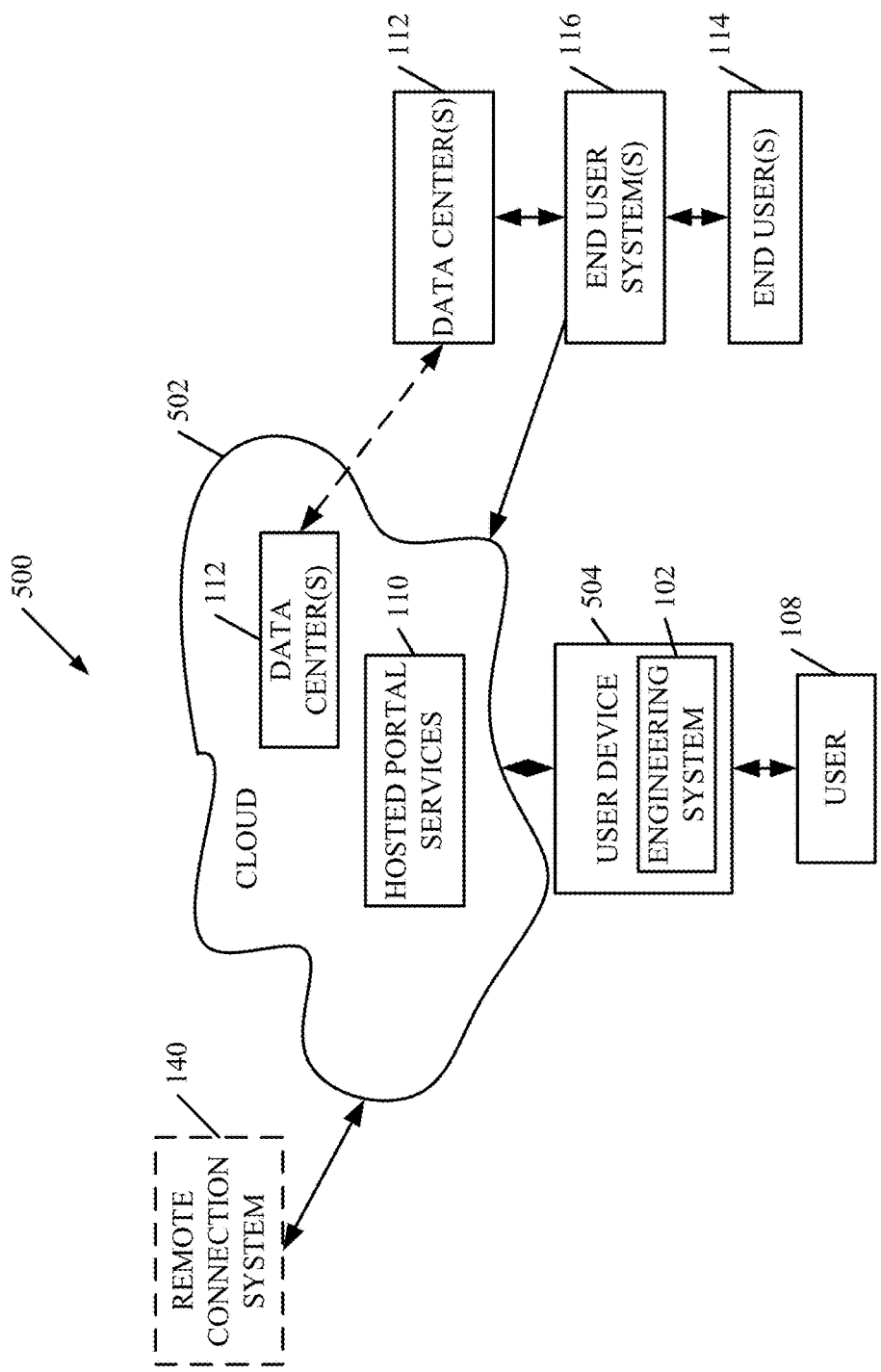
FIG. 8 shows one example of the architecture illustrated in FIG. 1, deployed in a cloud computing architecture.

FIG. 8 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 8, some items are similar to those shown in FIG. 1 and they are similarly numbered. FIG. 8 specifically shows that hosted portal services 110 and data centers 112 can be located in cloud 502 (which can be public, private, or a combination where portions are public while others are private). Therefore, users 108 and 114 can use a user device 504 or end user systems 116 to access those systems through cloud 502.

FIG. 8 also depicts another example of a cloud architecture. FIG. 8 shows that it is also contemplated that some or all elements of systems 102, 110 or 112 can be disposed in cloud 502 while others are not. By way of example, data centers 112 can be disposed outside of cloud 502, and accessed through cloud 502. In another example, remote connection system 140 can also be outside of cloud 502. Regardless of where they are located, they can be accessed directly by devices 504 or systems 116, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
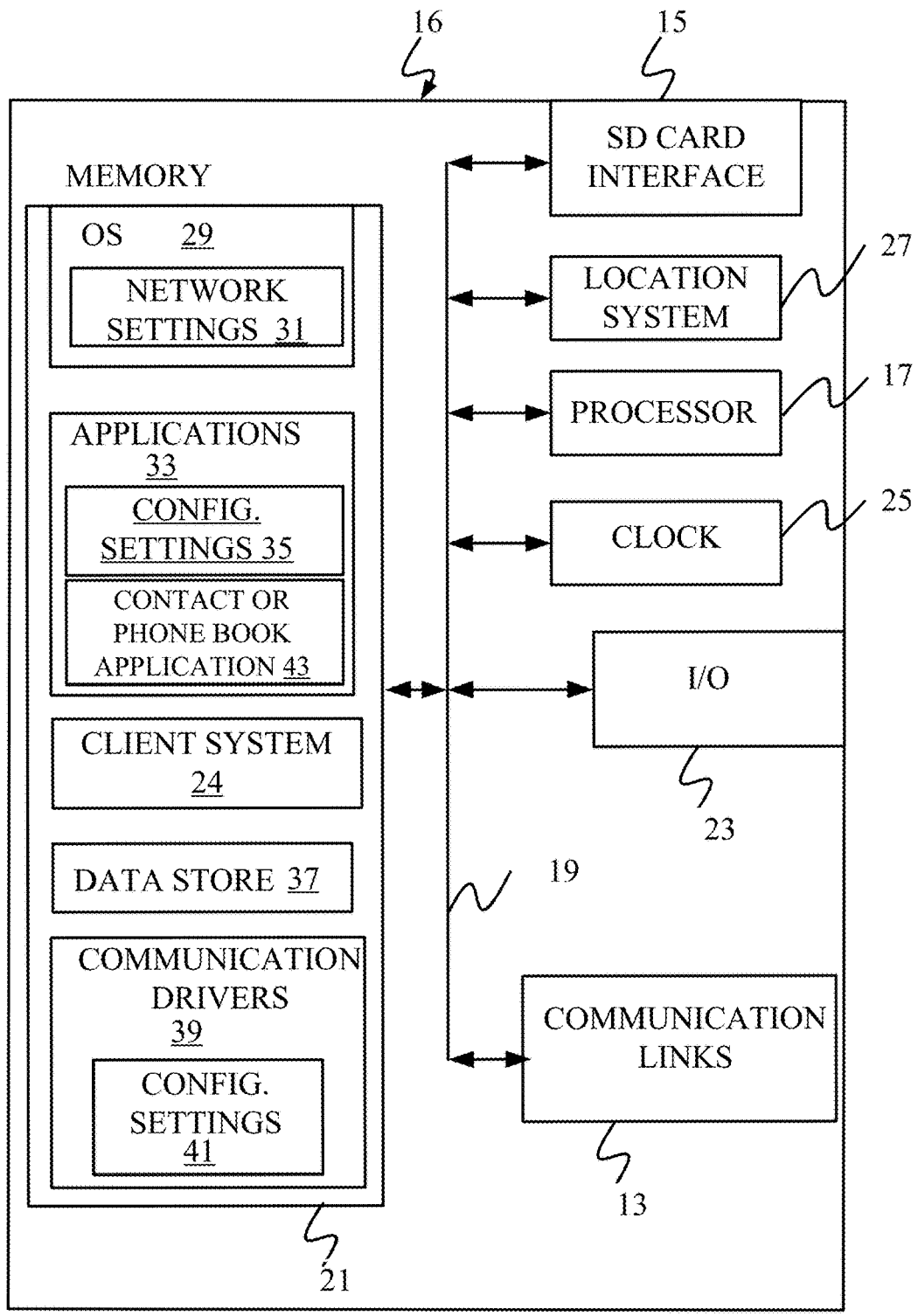
FIGS. 9-11 show examples of mobile devices that can be used in the architectures shown in previous figures.
Figure 10:
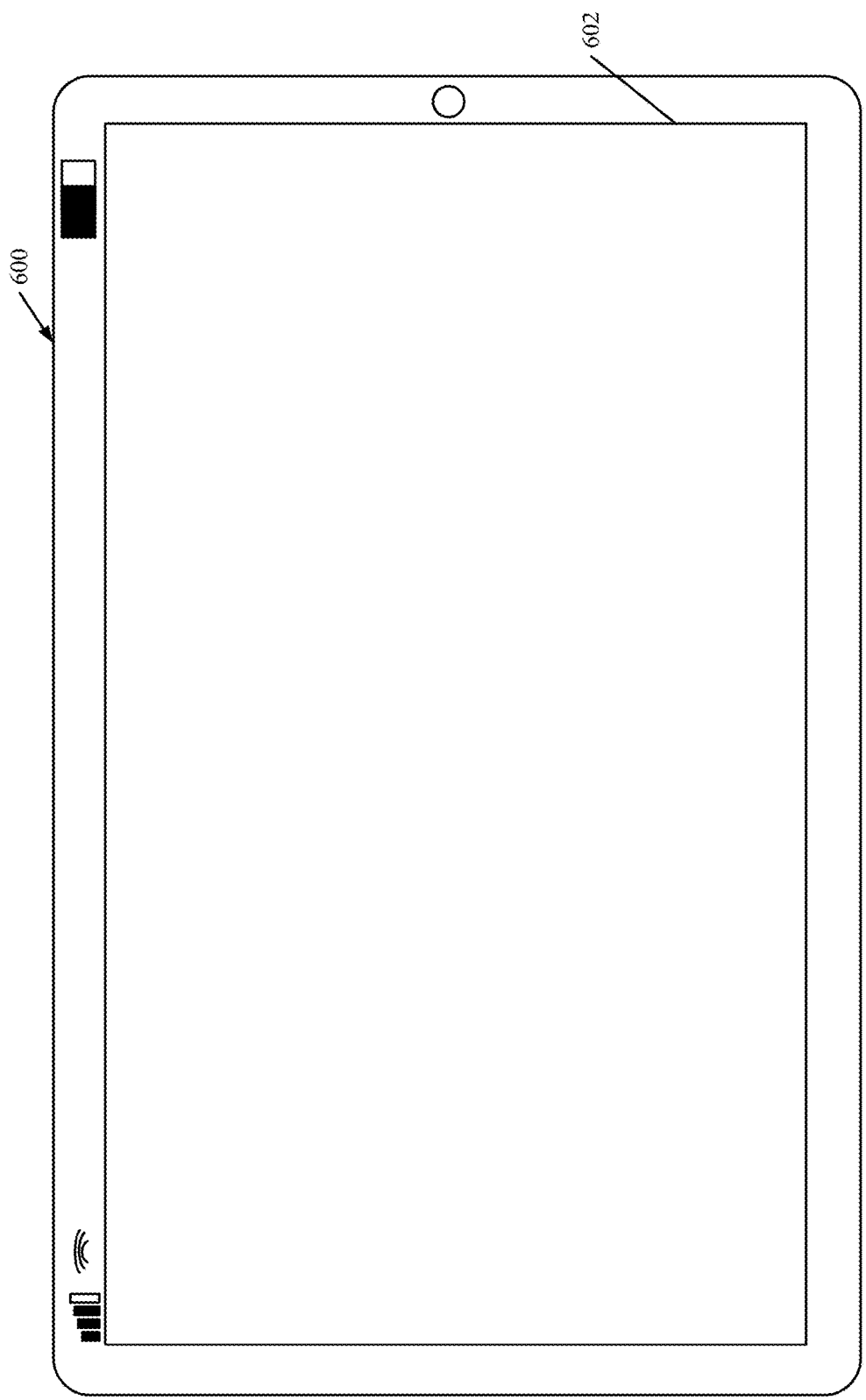
Figure 11:
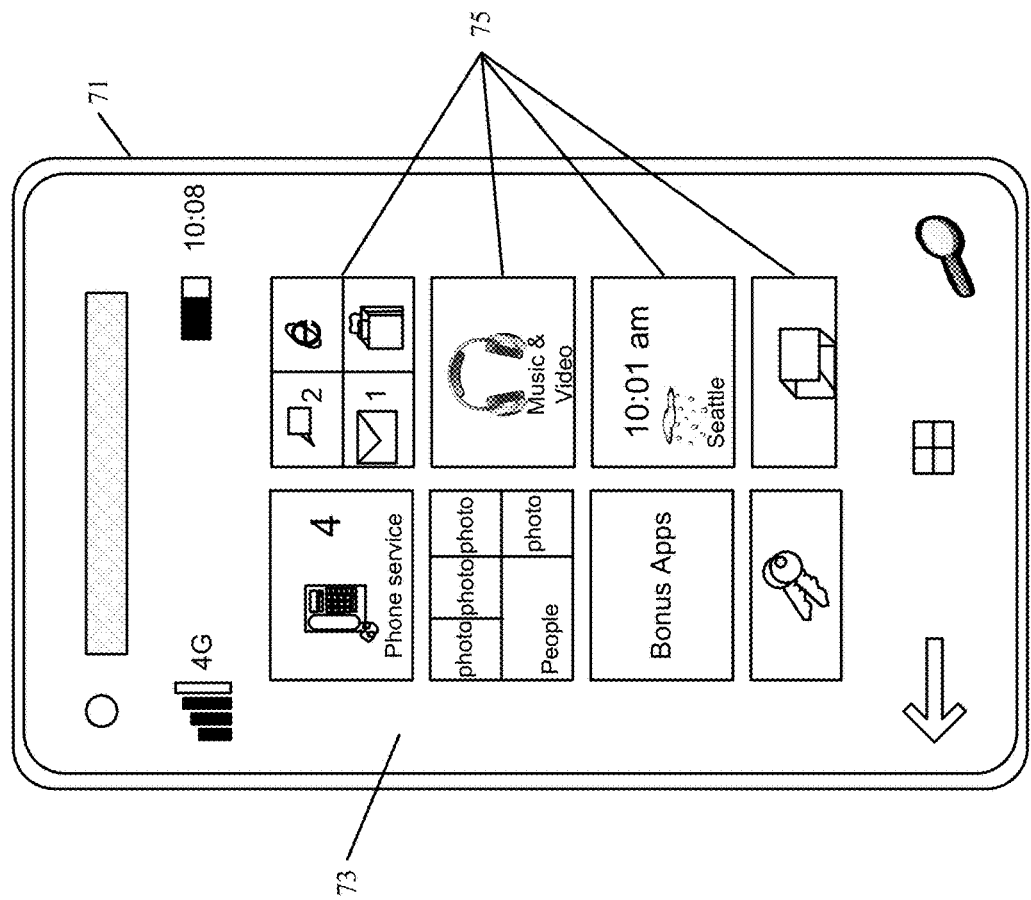

FIG. 9 is a simplified block diagram of one illustrative example of a handheld or mobile computing device that can be used as a user's or client's hand held device 16, in which the present system (or parts of it) can be deployed. FIGS. 10-11 are examples of handheld or mobile devices.

FIG. 9 provides a general block diagram of the components of a client device 16 that can run components of any of systems 102, 110, 112, 116 or device 504 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

Under other example, applications or systems are received on a removable Secure Digital (SD) card that is connected to a SD card interface 15. SD card interface 15 and communication links 13 communicate with a processor 17 (which can also embody processors in the previous Figures) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Application 154 or the items in data store 156, for example, can reside in memory 21. Similarly, device 16 can have a client business system 24 which can run various business applications or embody parts or all of tenant 104. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 10 shows one embodiment in which device 16 is a tablet computer 600. In FIG. 10, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be a feature phone, smart phone or mobile phone. The phone can include a set of keypads for dialing phone numbers, a display capable of displaying images including application images, icons, web pages, photographs, and video, and control buttons for selecting items shown on the display. The phone can includes an antenna for receiving cellular phone signals such as General Packet Radio Service (GPRS) and 1Xrtt, and Short Message Service (SMS) signals. In some examples, phone also includes a Secure Digital (SD) card slot that accepts a SD card.

The mobile device can also be a personal digital assistant or a multimedia player or a tablet computing device, etc. (hereinafter referred to as PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can also include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 11 shows that the phone can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
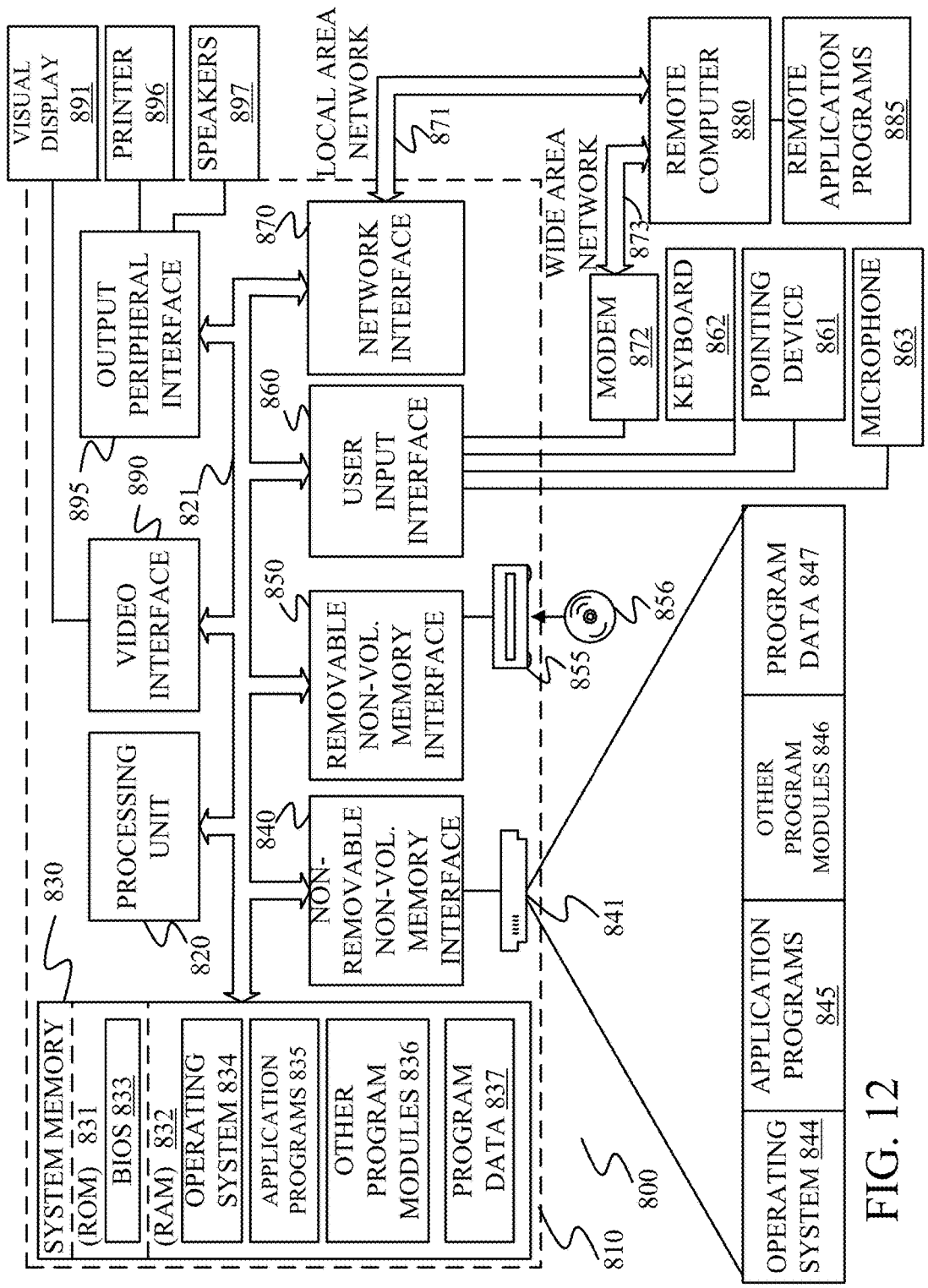
FIG. 12 is a block diagram of one example of a computing environment that can be deployed in the architectures shown in previous figures.

FIG. 12 is one example of a computing environment in which architecture 100, or parts of it, (for example) can be deployed. With reference to FIG. 12, an example system for implementing some embodiments includes a general-purpose computing device in the form of a computer 810. Components of computer 810 may include, but are not limited to, a processing unit 820 (which can comprise processors or servers shown above), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 12 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 12 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
a user interface component;
a set of computing system functionality components that control the user interface component to generate functionality user interface displays with functionality user input mechanisms that are actuated to perform functionality on a remote endpoint computing system, over a set of connections to the remote endpoint computing system; and
a remote connection system that includes a set of runspace components, each having an associated connection in the set of connections, and a first timer component that generates a first timer output indicative of a first timeout period, the remote connection system intermittently submitting a request through the runspace components, based on the first timer output, over each of the connections in the set of connections, the remote endpoint computing system disabling the connections for lack of use based on a session timeout period, and the first timer being configured so the first timeout period is based on the session timeout period and a number of runspace components in the set of runspace components.

Example 2 is the computing system of any or all previous examples and further comprising:
a set of cache pool systems, each cache pool system corresponding to a different one of the endpoint computing systems and having an opened runspace cache pool that stores runspace components that have active connections to the corresponding endpoint computing system.

Example 3 is the computing system of any or all previous examples wherein the first timer is configured so the first timeout period varies dynamically based on a number of runspace components in the opened runspace cache pool.

Example 4 is the computing system of any or all previous examples wherein the first timer is configured so the first timeout period is a period comprising the session timeout period divided by the number of runspace components in the opened runspace cache pool.

Example 5 is the computing system of any or all previous examples wherein each opened runspace cache pools have a corresponding last known good queue that identifies the runspace components in the opened runspace cache pool in an order in which they were last used.

Example 6 is the computing system of any or all previous examples wherein the set of computing system functionality performs the functionality on the remote endpoint computing system by submitting a request through a selected runspace component and further comprising:
a server request component that receives a submit input indicative of the request and selects a runspace component to obtain the selected runspace component.

Example 7 is the computing system of any or all previous examples wherein the server request component selects the runspace component based on contents of the last known good queue.

Example 8 is the computing system of any or all previous examples wherein each cache pool system comprises:
a closed runspace cache pool that stores runspace components that have closed connections to the corresponding endpoint computing system.

Example 8 is the computing system of any or all previous examples and further comprising:
a second timer component that generates a second timer output indicative of a second timeout period;
an open component that selects a runspace component from the closed runspace cache pool and attempts to open a connection corresponding to the selected runspace component; and
a move component that, if the open component successfully opens the selected runspace component, moves the selected runspace component to the opened runspace cache pool and enters it in the last known good queue.

Example 10 is the computing system of any or all previous examples and further comprising:
a third timer component that generates a third timer output indicative of a third timeout period; and
a boundary checking component that, based on the third timeout period, determines whether a total number of runspace components in a given cache pool system meets a size change boundary.

Example 11 is the computing system of any or all previous examples and further comprising:
a size change system that changes the total number of runspace components in the given cache pool system in response to the boundary checking component indicating that the total number of runspace components meets the size change boundary.

Example 12 is a computer implemented method, comprising:
controlling a user interface component to generate functionality user interface displays with functionality user input mechanisms;
detecting actuation of the functionality user input mechanisms to perform functionality on a remote endpoint computing system, by submitting a functionality request to a runspace component, in a set of runspace components, that each have a corresponding connection to the remote endpoint computing system;
generating a keep alive timer output indicative of a keep alive timeout period;
and
submitting a request through the runspace components, based on the keep alive timer output, over each of the connections, the remote endpoint computing system disabling the connections for lack of use based on a session timeout period, and the keep alive timeout period being based on the session timeout period and a number of runspace components in the set of runspace components.

Example 13 is the computer implemented method of any or all previous examples each of a set of cache pool systems corresponds to a different one of a plurality of endpoint computing systems and has an opened runspace cache pool that stores runspace components that have active connections to the corresponding endpoint computing system, and wherein generating the keep alive timer output comprises:
varying the keep alive timeout period dynamically based on a number of runspace components in the opened runspace cache pool.

Example 14 is the computer implemented method of any or all previous examples and further comprising:
identifying the runspace components in the opened runspace cache pool in a last known good queue in an order in which they were last successfully used.

Example 15 is the computer implemented method of any or all previous examples further comprising:
receiving a submit input indicative of the request; and
selecting the runspace component to receive the request based on contents of the last known good queue.

Example 16 is the computer implemented method of any or all previous examples and further comprising:
storing runspace components that have closed connections to the corresponding endpoint computing system in a closed runspace cache pool;
generating an open runspace timer output indicative of an open runspace timeout period;
selecting a runspace component from the closed runspace cache pool;
attempting to open a connection corresponding to the selected runspace component; and
if the open component successfully opens the selected runspace component, moving the selected runspace component to the opened runspace cache pool.

Example 17 is the computer implemented method of any or all previous examples and further comprising:
generating a check pool size timer output indicative of a check pool size timeout period;
determining, based on the check pool size timeout period, whether a total number of runspace components in a given cache pool system meets a size change boundary; and
if so, changing the total number of runspace components in the given cache pool system.

Example 18 is a computing system, comprising:
a set of cache pool systems, each cache pool system corresponding to a different one of a plurality of endpoint computing systems and having an opened runspace cache pool that stores runspace components that have active connections to the corresponding endpoint computing system;
a first timer component that generates a first timer output indicative of a first timeout period; and a remote connection system intermittently submitting a request through the runspace components to the endpoint computing systems, based on the first timer output, over each of the active connections, the remote endpoint computing system disabling the connections for lack of use based on a session timeout period, and the first timer being configured so the first timeout period varies dynamically based, at least in part, on the session timeout period and a number of runspace components.

Example 19 is the computing system of any or all previous examples wherein each cache pool system comprises:

a closed runspace cache pool that stores runspace components that have closed connections to the corresponding endpoint computing system;

a second timer component that generates a second timer output indicative of a second timeout period;

an open component that selects a runspace component from the closed runspace cache pool and attempts to open a connection corresponding to the selected runspace component; and a move component that, if the open component successfully opens the selected runspace component, moves the selected runspace component to the opened runspace cache pool and enters it in the last known good queue.

Example 20 is the computing system of any or all previous examples and further comprising:

a third timer component that generates a third timer output indicative of a third timeout period;

a boundary checking component that, based on the third timeout period, determines whether a total number of runspace components in a given cache pool system meets a size change boundary; and a size change system that changes the total number of runspace components in the given cache pool system in response to the boundary checking component indicating that the total number of runspace components meets the size change boundary.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
a processor and
memory storing instructions executable by the processor, wherein the instructions, when executed, configure the computing system to provide:
   a set of computing system functionality components configured to:
      control a user interface component to generate functionality user interface displays with functionality user input mechanisms that are actuated to perform functionality on a remote endpoint computing, system, over a plurality of connections to the remote endpoint computing system;
   a remote connection system that includes:
      a plurality of runspace components, each runspace component being associated with one of the connections, in the plurality of connections, and configured to submit a request using the associated connection;
      a data store component configured to store runspace order information identifying an order in which the plurality of runspace components were last used to submit requests using the connections; and
      a first timer component configured to:
         identify the number of runspace components in the plurality of runspace components; and
         define a first timeout period that is based cm both:
            a session timeout period in which connections, in the plurality of connections to the remote endpoint computing system, are disabled by the remote endpoint computing system for lack of use, and
            the identified number of runspace components; and
      a request component configured to:
         submit a series of requests through the plurality of runspace components, over each of the connections in the plurality of connections, based on the runspace order information,
         wherein the series of requests is submitted intermittently based on the first timeout period.

2. The computing system of claim 1 wherein the instructions configure the computing system to provide:
a set of cache pool systems, each cache pool system corresponding to a different one of a plurality of endpoint computing systems, and
having an opened runspace cache pool configured to store runspace components that have active connections to the corresponding endpoint computing system.

3. The computing system of claim 2 wherein the first timer component is configured to dynamically vary the first timeout period based on changes to a number of runspace components in the opened runspace cache pools.

4. The computing system of claim 3 wherein the first timer component is configured to define the first timeout period by dividing the session timeout period by the number of runspace components in the opened runspace cache pools.

5. The computing system of claim 3 wherein the data store comprises:
a last known good queue configured to identify the runspace components in the opened runspace cache pools in an order in which they were last used.

6. The computing system of claim 5 wherein the request component is configured to intermittently submit the series of requests by iteratively:
receiving an indication from the first timer component indicative of expiration of the first timeout period; and
in response to the indication,
   selecting a runspace component based on the last known good queue; and
   submitting a request to the selected runspace component;
wherein, based on the submission of the request to the selected runspace component, the last known good queue is updated.

7. The computing system of claim 6 wherein each cache pool system comprises:
a closed runspace cache pool configured to store runspace components that have closed connections to the corresponding endpoint computing system.

8. The computing system of claim 7 wherein the instructions configure the computing system to provide:
a second tinier component configured to generate a second timer output indicative of a second timeout period;
an open component configured to select a runspace component from the closed runspace cache pool and attempt to open a connection corresponding to the selected runspace component; and a move component configured to, if the open component successfully opens the selected runspace component, move the selected sunspace component to the opened runspace cache pool and enter the selected runspace component in the last known good queue.

9. The computing system of claim 7 wherein the instructions configure the computing system to provide:

a third timer component configured to generate a third timer output indicative of a third timeout period; and a boundary checking component configured to, based on the third timeout period, determine whether a total number of runspace components meets a size change boundary.

10. The computing system of claim 9 wherein the instructions configure the computing system to provide:

a size change system configured to change the total number of runspace components in response to the boundary checking component indicating that the total number of runspace components meets the size change boundary.

11. A computer implemented method, comprising;

generating functionality user interface displays with functionality user input mechanisms;

detecting actuation of the functionality user input mechanisms to perform functionality on a remote endpoint computing system, by submitting a functionality request to a runspace component, in a plurality of runspace components having a plurality of connections to the remote endpoint computing system, each runspace component being associated with one of the connections, in the plurality of connections, and configured to submit a request using the associated connection;

storing runspace order information identifying an order in which the plurality of runspace components were last used to submit requests using the connections;

identifying the number of runspace components in the plurality of runspace components;

generating a keep alive timer output indicative of a keep alive timeout period that is based on both:

a session timeout period in which connections, in the plurality of connections to the remote endpoint computing system, are disabled by the remote endpoint computing system for lack of use, and the identified number of runspace components; and submitting a series of requests through the runspace components, over each of the connections in the plurality of connections, based on the runspace order information, wherein the series of requests is submitted intermittently based on the keep alive timeout period.

12. The computer implemented method of claim 11 wherein each of a set of cache pool systems corresponds to a different one of a plurality of endpoint computing systems and has an opened runspace cache pool that stores runspace components that have active connections to the corresponding endpoint computing system, and wherein generating the keep alive timer output comprises:

varying the keep alive timeout period dynamically based on a number of runspace components in the opened runspace cache pools.

13. The computer implemented method of claim 12 and further comprising:

identifying the space components in the opened runspace cache pools in a last known good queue in an order in which they were last successfully used.

14. The computer implemented method of claim 13 further comprising:

receiving a submit input indicative of the request; and selecting the runspace component to receive the request based on contents of the last known good queue.

15. The computer implemented method of claim 14 and further comprising:

storing runspace components that have closed connections to the corresponding endpoint computing system in a closed runspace cache pool;

generating an open runspace timer output indicative of an open runspace timeout period;

selecting a runspace component from the closed runspace cache pool;

attempting to open a connection corresponding to the selected runspace component; and if the open component successfully opens the selected runspace component, moving the selected runspace component to the opened sunspace cache pool.

16. The computer implemented method of claim 15 and further comprising:

generating a check pool size timer output indicative of a check pool size timeout period;

determining, based on the check pool size timeout period, whether a total number of runspace components meets a size change boundary; and if so, changing the total number of runspace components in the given cache pool system.

17. A computing system, comprising:

a processor; and memory storing instructions executable by the processor, wherein the instructions, when executed, configure the computing system to provide:

a set of cache pool systems, each cache pool system corresponding to a different one of a plurality of endpoint computing systems, and having an opened runspace cache pool that stores a plurality of runspace components that have active connections to the corresponding endpoint computing system;

a first timer component configured to:

identify the number of runspace components in the plurality of runspace components;

generate a first timer output indicative of a first timeout period that is based on both:

a session timeout period in which connections, in the plurality of connections to the corresponding remote endpoint computing system, are disabled by the corresponding remote endpoint computing system for lack of use, and the identified number of runspace components, wherein the first timeout period is varied dynamically based on changes to the number of runspace components; and a remote connection system configured to:

access runspace order information identifying an order in which the plurality of runspace components were last used to submit requests using the connections; and submit a series of requests through the plurality of runspace components, over each of the connections in the plurality of connections, based on the space order information, wherein the series of requests is submitted intermittently based on the first timeout period.

18. The computing system of claim 17 wherein each cache pool system comprises a closed runspace cache pool that stores runspace components that have closed connections to the corresponding endpoint computing system, and wherein the remote connection system comprises:
- a second timer component configured to generate a second timer output indicative of a second timeout period;
- an open component configured to select a runspace component from the closed runspace cache pool and attempt to open a connection corresponding to the selected runspace component; and
- a move component configured to, if the open component successfully opens the selected runspace component, move the selected runspace component to the opened runspace cache pool and enter it in the last known good queue.

19. The computing system of claim 18 and further comprising:
- a third timer component configured to generate a third timer output indicative of a third timeout period;
- a boundary checking component configured to, based on the third timeout period, determine whether a total number of runspace components meets a size change boundary; and
- a size change system configured to change the total number of runspace components in response to the boundary checking component indicating that the total number of runspace components meets the size change boundary.

* * * * *